United States Patent
Liang et al.

(10) Patent No.: US 11,932,717 B2
(45) Date of Patent: Mar. 19, 2024

(54) GREEN SYNTHESIS METHOD OF ANTIBACTERIAL SUPER-POROUS HYDROGEL, PRODUCT OF ANTIBACTERIAL SUPER-POROUS HYDROGEL AND APPLICATION OF ANTIBACTERIAL SUPER-POROUS HYDROGEL TO DEGRADATION OF VARIOUS POLLUTANTS IN WASTEWATER TREATMENT

(71) Applicant: Hangzhou Normal University, Hangzhou (CN)

(72) Inventors: Yuanyuan Liang, Hangzhou (CN); Yongjin Li, Hangzhou (CN)

(73) Assignee: Hangzhou Normal University, Hangzhou (CN)

( * ) Notice: Subject to any disclaimer, the term of this patent is extended or adjusted under 35 U.S.C. 154(b) by 0 days.

(21) Appl. No.: 18/321,857

(22) Filed: May 23, 2023

(65) Prior Publication Data
US 2023/0322997 A1 Oct. 12, 2023

Related U.S. Application Data

(63) Continuation of application No. PCT/CN2022/116985, filed on Sep. 5, 2022.

(30) Foreign Application Priority Data

Feb. 24, 2022 (CN) .......................... 202210172185.9

(51) Int. Cl.
| | | |
|---|---|---|
| *C08F 2/46* | (2006.01) | |
| *C02F 3/10* | (2023.01) | |
| *C08F 2/50* | (2006.01) | |
| *C08F 283/06* | (2006.01) | |
| *C08G 61/04* | (2006.01) | |
| *C08J 3/075* | (2006.01) | |

(52) U.S. Cl.
CPC .......... *C08F 283/065* (2013.01); *C02F 3/108* (2013.01); *C08J 3/075* (2013.01)

(58) Field of Classification Search
CPC ...... C09J 3/075; C09J 283/065; Y02W 10/37; C02F 3/108
USPC .................................................... 522/1; 520/1
See application file for complete search history.

(56) References Cited

FOREIGN PATENT DOCUMENTS

| | | | |
|---|---|---|---|
| CN | 109503780 A | | 3/2019 |
| CN | 112014441 A | | 12/2020 |
| CN | 112979888 | * | 6/2021 |
| CN | 112979888 A | | 6/2021 |
| CN | 114702691 | * | 7/2022 |
| JP | 2015025056 A | | 2/2015 |

OTHER PUBLICATIONS

Liang et al, CN 112979888 Machine Translation, Jun. 18, 2021 (Year: 2021).*
Wang et al, CN 114702691 Machine Translation, Jul. 5, 2022 (Year: 2022).*
Internation Search Report of PCT/CN2022/116985, dated Dec. 9, 2022.

* cited by examiner

*Primary Examiner* — Jessica Whiteley

(57) ABSTRACT

Disclosed are a green synthesis method of an antibacterial super-porous hydrogel, a product of the antibacterial super-porous hydrogel and an application of the antibacterial super-porous hydrogel to degradation of various pollutants in wastewater treatment. The super-porous hydrogel based on poly (ionic liquid) is prepared by copolymerization of an imidazole type ionic liquid with double bonds and polyethylene glycol diacrylate (PEGDA) as a cross-linker. In the reaction system, water is a good solvent for the monomer ionic liquid and PEGDA, but a poor solvent for the poly (ionic liquid); when an initial concentration of the ionic liquid is higher than 25%, the phase separation typically proceeds through poly(ionic liquid) formation, interconnected networks with macroporous structure could be obtained by photo-crosslinking.

5 Claims, 8 Drawing Sheets

GREEN SYNTHESIS METHOD OF ANTIBACTERIAL SUPER-POROUS HYDROGEL, PRODUCT OF ANTIBACTERIAL SUPER-POROUS HYDROGEL AND APPLICATION OF ANTIBACTERIAL SUPER-POROUS HYDROGEL TO DEGRADATION OF VARIOUS POLLUTANTS IN WASTEWATER TREATMENT

CROSS-REFERENCE TO RELATED APPLICATIONS

This application is a continuation of International Patent Application No. PCT/CN2022/116985 with a filing date of Sep. 5, 2022, designating the United States, now pending, and further claims priority to Chinese Patent Application No. 202210172185.9 with a filing date of Feb. 24, 2022. The content of the aforementioned applications, including any intervening amendments thereto, are incorporated herein by reference.

TECHNICAL FIELD

The present invention belongs to the field of wastewater treatment, relates to a super-porous hydrogel for wastewater treatment, is particularly suitable for wastewater containing anionic dyes and heavy metal ions, and is specifically a green synthesis method of an antibacterial super-porous hydrogel, a product of the antibacterial super-porous hydrogel and an application of the antibacterial super-porous hydrogel to degradation of various pollutants in wastewater treatment.

BACKGROUND OF THE PRESENT INVENTION

With the rapid development of modern technology, more and more industrial wastes such as heavy metals and dyes are discharged into the natural environment, which has caused serious pollution to a water body and gradually become one of main pollution sources of the water body. Therefore, the treatment of industrial wastewater containing dyes and heavy metal ions is one of focuses of environmental protection industry in recent years, and it is of great significance to effectively remove the dyes and the heavy metal ions from the water body to improve the environment of the water body.

An adsorption method is one of main methods for treating the wastewater containing the dyes and the heavy metal ions at present, has the advantages of simple operation, high efficiency, wide applicability, high selectivity and no toxic degradation products, and is a hot spot in the field of wastewater treatment. The basic principle of adsorption is a process of adhering one substance to a surface of another substance, and when a porous solid substance is contacted with a liquid, one or more ingredients in the liquid may be adsorbed on a solid surface. The selection of an adsorbent type is the key to an efficient and rapid adsorption process.

Hydrogel is one of new polymer materials with a three-dimensional network structure formed by proper physical or chemical crosslinking, and due to unique water absorption and water retention characteristics, the hydrogel has many advantages of less residues, high adsorption efficiency and reutilization as an adsorbent, thus being widely used in the field of wastewater treatment. However, although the hydrogel synthesized by a traditional method has a high swelling rate, a swelling process is usually slow and may last for several hours or even days, which greatly limits the application of the hydrogel. For example, Chi Zhang, et al. prepared a composite hydrogel with sodium alginate and multi-walled carbon nanotubes as main raw materials, which could adsorb a methylene blue dye, but it took 120 hours for an adsorption rate to reach 83.46%, so that the hydrogel size needed to be reduced to improve a swelling rate. In order to get rid of the limitation of the hydrogel size on the swelling rate of the hydrogel, it is an effective method to introduce a porous structure into the hydrogel, and the pore size of the presently developed hydrogel with super-large pores is 50 μm to 100 μm. Therefore, on one hand, the permeation resistance of water can be reduced through a capillary action to make the water enter the hydrogel quickly, and on the other hand, the porous structure inside the hydrogel increases a specific surface area inside the hydrogel to make hydrophilic groups inside the hydrogel in contact with the water quickly, thus improving a water absorption rate. Based on the above structure, the super-porous hydrogel may have a high water absorption capacity and a swelling balance time shortened to several hours or even minutes, so that the sewage treatment efficiency can be greatly improved. For example, Singh, et al. prepared a guar gum grafted acrylamide macroporoushydrogel by adopting a $CO_2$ foaming technology, which could reduce the swelling balance time of the hydrogel in water from 24 hours to 6 hours. Yuanmeng Zhang, et al. prepared the porous hydrogel with 2-acrylamido-2-methylpropanesulfonic acid and polyvinyl alcohol as main raw materials, which had an adsorption capacity of $Cd^{2+}$ as high as 155.1 mg/g within 1.5 hours. However, most hydrogels used for sewage treatment have a single function at present, and can only realize the adsorption and separation of one category of harmful substances in the water body. In fact, there are often multiple harmful substances (such as inorganic heavy metals and organic dye molecules) and microorganisms in the polluted water body, and in wastewater treatment or water body purification treatment, the inhibition or removal of microbial bacteria is also an important link to be considered. Therefore, it is still an important challenge for wastewater treatment to develop the porous hydrogel with multiple adsorption and antibacterial functions to realize the adsorption and separation of multiple harmful substances and the control of microorganisms in wastewater.

An ionic liquid is composed of organic cations and inorganic anions, and has many advantages of adjustable structure and designability, especially for an organic cationic imidazole ionic liquid, a large number of studies have shown that the ionic liquid has an excellent antibacterial property and a good biocompatibility. The poroushydrogel prepared with the imidazole ionic liquid as a skeleton molecule may have the following advantages: 1. the hydrogel may have a persistent antibacterial property and can effectively inhibit microbial pollution when used in wastewater or water body purification treatment; 2. a nitrogen atom of an imidazole organic cation structural unit has lone pair electrons, which may effectively chelate with metal cations in the solution to realize the adsorption and separation of heavy metals; and 3. an inorganic anion unit may realize the adsorption and separation of anionic dyes in the water body through an ion exchange reaction.

The present invention provides an antibacterial super-porous hydrogel with rapid adsorption and separation of anionic dyes and heavy metal ions, a skeleton structure of the hydrogel is a polyimidazole salt ionic liquid, which has a persistent antibacterial property, and can simultaneously realize the efficient adsorption and separation of heavy metal ions of $Cr^{2+}$ and $Pb^{2+}$ and anionic dyes of Congo red (Cr), reactive blue 19(RB19) and acid orange 7(A07). The present invention further provides a method for preparing the super-porous hydrogel with the imidazole salt poly (ionic liquid) as a raw material by a one-pot method, and the method is simple, green and environment-friendly, does not need to add an additional pore-forming agent, and obtains the super-porous hydrogel with the pore size of 50 um to 200 um by adjusting an amount of a cross-linker and a freeze-drying time.

SUMMARY OF PRESENT INVENTION

The present invention provides a preparation method of an antibacterial super-porous hydrogel capable of effectively removing anionic dyes and heavy metal ions in sewage aiming at the defect that a hydrogel prepared by the prior art is difficult to remove various pollutants (anionic dyes, heavy metal ions and microorganisms) in sewage.

According to the present invention, the poly (ionic liquid) super-porous hydrogel is prepared by copolymerization of an imidazole type ionic liquid with double bonds and a cross-linker. In the reaction system, water is a good solvent for the monomer ionic liquid and PEGDA, but a poor solvent for the poly (ionic liquid); when an initial concentration of the ionic liquid is higher than 25%, phase separation and microphase separation are gradually carried out on a monomer phase rich in the poly (ionic liquid) and water, and a water phase in a hydrogel three-dimensional network structure formed by the poly (ionic liquid) and PEGDA occupies a relatively large space (the microphase separation process is beneficial to formation of interpenetrating channels in the hydrogel network structure); and finally, the unreacted monomer ionic liquid is removed by adopting a pure water dialysis method, and then moisture in the hydrogel is removed by adopting a freeze-drying method to finally obtain the macroporous or super-macroporous hydrogel.

According to the preparation method of the antibacterial super-porous hydrogel provided by the present invention, a pore size of the gel is adjustable from 50 μm to 200 μm, and the method comprises the following steps of:
  step (1): adding an imidazole ionic liquid and polyethylene glycol diacrylate into deionized water, and magnetically stirring the mixture for a certain time to obtain a uniform solution; and adding a photoinitiator lithium phenyl(2,4,6-trimethylbenzoyl)phosphinate into the solution, and magnetically stirring the mixture for a certain time in the dark until the mixture is completely dissolved, wherein amass ratio of the imidazole ionic liquid to the deionized water is (0.25 to 0.6): 1; and a mass ratio of the imidazole ionic liquid to the polyethylene glycol diacrylate is 1 to 100:0.1 to 10;
  step (2): pouring the solution obtained in the step (1) into a mold, and irradiating for a period of time under an ultraviolet lamp with a certain power to initiate polymerization to obtain a poly (ionic liquid)hydrogel; and
  step (3): soaking the poly (ionic liquid)hydrogel obtained in the step (2) in the deionized water to dialyze for a certain time, and removing an unreacted poly (ionic liquid) monomer and a poly (ionic liquid) homopolymer in the hydrogel; and then freeze-drying the hydrogel at a certain temperature for a certain time to obtain the poly (ionic liquid) super-porous hydrogel.

Preferably, the imidazole ionic liquid in the step (1) is an imidazole group-containing vinyl imidazole salt ionic liquid with different alkyl chain lengths and anionic species, with a molecular formula as follows:

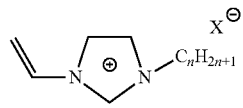

wherein X is one of $Cl^-$, $Br^-$, $PF_6^-$, $BF_4^-$ and $CH_3COO^-$, and n=2 to 12.

Preferably, an anion in the imidazole ionic liquid in the step (1) comprises, but is not limited to, a chloride ion, a tetrafluoroborate ion and a hexafluorophosphate ion.

Preferably, a molecular weight of the polyethylene glycol diacrylate in the step (1) is 200 to 10,000.

Preferably, a mass ratio of the imidazole ionic liquid to the photoinitiator lithium phenyl (2,4,6-trimethylbenzoyl)phosphinate in the step (1) is 1 to 100:0.01 to 1.

Preferably, in the step (2), the power of the ultraviolet lamp is 20 W to 200 W, and the irradiating lasts for 1 minute to 200 minutes.

Preferably, in the step (3), the soaking to dialyze lasts for 1 hour to 72 hours, the freeze-drying is carried out at a temperature of −120° C. to −60° C., and the freeze-drying lasts for 8 hours to 96 hours.

Another object of the present invention is to provide an antibacterial super-porous hydrogel prepared by the above method, with a pore size ranging from 50 μm to 200 μm.

Another object of the present invention is to provide an application of the above antibacterial super-porous hydrogel in wastewater treatment.

Preferably, the antibacterial super-porous hydrogel is applied to the degradation of anionic dyes, heavy metal ions and microorganisms in wastewater.

Preferably, the heavy metal ions comprise $Cr^{2+}$ and $Pb^{2+}$, and the anionic dyes comprise Congo red (Cr), reactive blue 19 (RB19) and acid orange 7 (A07).

According to the present invention, the hydrogel may remove various anionic dyes in sewage through electrostatic adsorption by utilizing the characteristic that an imidazole ring of the monomer ionic liquid carries positive charges; the hydrogel may remove various heavy metal ions in sewage through chelation by utilizing the characteristic that the imidazole ring of the monomer ionic liquid carries N atoms of lone pair electrons; and the hydrogel may kill some microorganisms in a water body by utilizing an excellent antibacterial ability of the ionic liquid. Compared with the hydrogel prepared by the prior art, the present invention has a wider application range in the field of sewage treatment.

The present invention has the following beneficial effects.

(1) Water used in the present invention is a good solvent for the monomer ionic liquid and PEGDA, but a poor solvent for the poly (ionic liquid); phase separation and microphase separation are gradually carried out on a monomer phase rich in the poly (ionic liquid) and water by controlling an initial concentration of the ionic liquid, and a water phase in a hydrogel three-dimensional network structure formed by the poly (ionic liquid) and PEGDA occupies a relatively large space (the microphase separation process is beneficial to formation of interpenetrating channels in the hydrogel network structure); and finally, the unreacted monomer ionic liquid is removed by adopting a pure water dialysis method, and then moisture in the hydrogel is removed by adopting a freeze-drying method to finally obtain the macroporous or super-macroporous hydrogel.

Preparation steps of the present invention are simple, and toxic reagents such as an organic solvent are not used in synthesis and post-treatment, thus being safe, green and environment-friendly.

(2) The pore size of the poly (ionic liquid) super-porous hydrogel obtained by the present invention is adjustable from 50 μm to 200 μm, and meanwhile, the hydrogel has a good hydrophilicity, and may swell rapidly in water and adsorb pollutants.

(3) The present invention has an imidazole cation skeleton structure with a large number of positive charges, has a good adsorption capacity for anionic dyes and heavy metal ions in wastewater, and has the characteristics of fast adsorption rate, large adsorption capacity and high removal rate as an adsorbent.

(4) The present invention is formed by the polymerization of the ionic liquid, has a certain antibacterial ability, and may treat various microorganisms in wastewater to a certain extent.

(5) The present invention uses the imidazole ionic liquid as a main raw material to synthesize the poly (ionic liquid) super-porous hydrogel, and the hydrogel has the advantages of good hydrophilicity, fast swelling rate, fast adsorption rate for anionic dyes and heavy metal ions, large adsorption capacity, high removal rate and the like.

DETAILED DESCRIPTION OF PREFERRED EMBODIMENTS

As mentioned above, in view of the defects in the prior art, the inventor of this case put forward the technical solution of the present invention through long-term research and a lot of practice mainly based on at least the followings. (1) Water used in the present invention is a good solvent for the monomer ionic liquid and the PEGDA and a poor solvent for the poly (ionic liquid); phase separation are gradually carried out on a monomer phase rich in the poly (ionic liquid) and water by controlling an initial concentration of the ionic liquid, and a water phase in a hydrogel three-dimensional network structure formed by the poly (ionic liquid) and PEGDA occupies a relatively large space (the microphase separation process is beneficial to formation of interpenetrating channels in the hydrogel network structure); and finally, the unreacted monomer ionic liquid, the PEGDA and the initiator are removed by adopting a pure water dialysis method, and then moisture in the hydrogel is removed by adopting a freeze-drying method to finally obtain the macroporous or super-macroporous hydrogel. (2) According to the present invention, the hydrogel may remove various anionic dyes in sewage through electrostatic adsorption by utilizing the characteristic that an imidazole ring of the monomer ionic liquid carries positive charges; the hydrogel may remove various heavy metal ions in sewage through chelation by utilizing the characteristic that the imidazole ring of the monomer ionic liquid carries N atoms of lone pair electrons; and the hydrogel may kill some microorganisms in a water body by utilizing an excellent antibacterial ability of the ionic liquid.

To make the objects, technical solutions, and advantages of the present invention clearer, the present invention is further described in detail hereinafter with reference to the drawings and the embodiments. It should be understood that specific embodiments described herein are only used for explaining the present invention and are not intended to limit the present invention. In addition, the technical features involved in the implementations of the present invention described hereinafter may be combined with each other as long as they do not conflict with each other.

Figure 1:
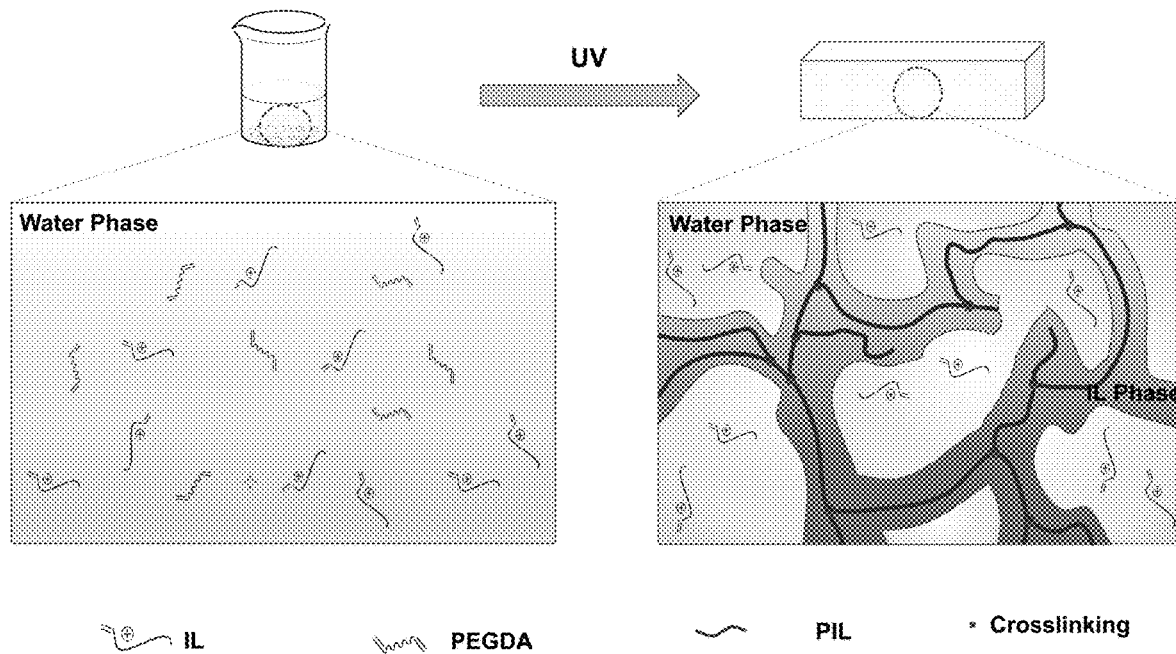
FIG. 1 is a schematic diagram of preparation of a super-porous hydrogel.

In one aspect, the present invention provides a preparation method of an antibacterial super-porous hydrogel, a pore size of the hydrogel is adjustable from 50 μm to 200 μm, and with reference to FIG. 1, the method comprises the following steps.

In step (1), an imidazole ionic liquid and polyethylene glycol diacrylate are added into deionized water, and magnetically stirred for a certain time to obtain a uniform solution; and a photoinitiator lithium phenyl(2,4,6-trimethylbenzoyl)phosphinate is added into the solution, and magnetically stirred for a certain time in the dark until the mixture is completely dissolved, wherein a mass ratio of the imidazole ionic liquid to the deionized water is (0.25 to 0.6):1; and a mass ratio of the imidazole ionic liquid to the polyethylene glycol diacrylate is 1 to 100:0.1 to 10.

In step (2), the solution obtained in the step (1) is poured into a mold, and irradiated for a period of time under an ultraviolet lamp with a certain power to initiate polymerization to obtain a poly (ionic liquid) gel.

A reaction equation of IL and PEGDA is as follows:

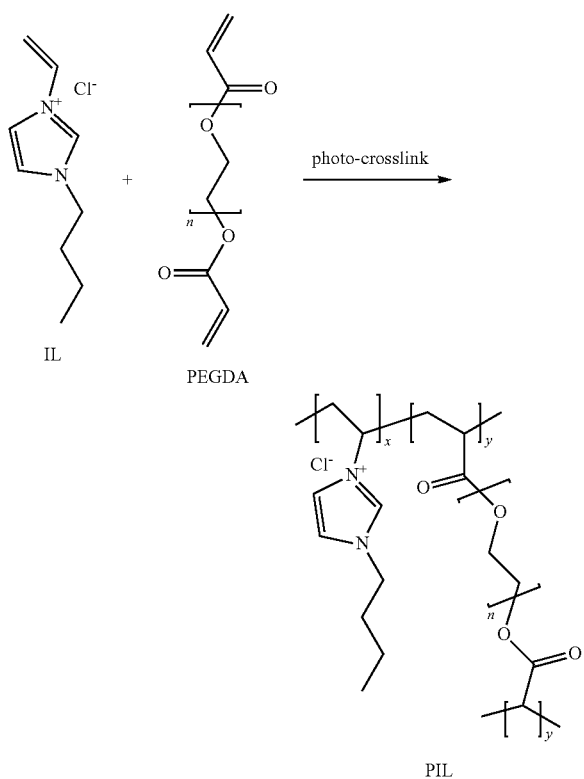

PIL

In step (3), the poly (ionic liquid)hydrogel obtained in the step (2) is soaked in the deionized water to dialyze for a certain time, and an unreacted poly (ionic liquid) monomer and a poly (ionic liquid) homopolymer in the hydrogel are removed; and then the hydrogel is freeze-dried at a certain temperature for a certain time to obtain the poly (ionic liquid) super-porous hydrogel.

Preferably, the imidazole ionic liquid in the step (1) is an imidazole group-containing vinyl imidazole salt ionic liquid with different alkyl chain lengths and anionic species, with a molecular formula as follows:

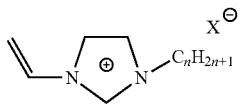

wherein X is one of $Cl^-$, $Br^-$, $PF_6^-$, $BF_4^-$ and $CH_3COO^-$, and n=2 to 12.

Preferably, an anion in the imidazole ionic liquid in the step (1) comprises, but is not limited to, a chloride ion, a tetrafluoroborate ion and a hexafluorophosphate ion.

Preferably, a molecular weight of the polyethylene glycol diacrylate in the step (1) is 200 to 10,000.

Preferably, a mass ratio of the imidazole ionic liquid to the photoinitiator lithium phenyl (2,4,6-trimethylbenzoyl)phosphinate in the step (1) is 1 to 100:0.01 to 1.

Preferably, in the step (2), the power of the ultraviolet lamp is 20 W to 200 W, and the irradiating lasts for 1 minute to 200 minutes.

Preferably, in the step (3), the soaking to dialyze lasts for 1 hour to 72 hours, the freeze-drying is carried out at a temperature of −120° C. to −60° C., and the freeze-drying lasts for 8 hours to 96 hours.

In another aspect, the present invention further provides an application of the antibacterial super-porous hydrogel in wastewater treatment.

Preferably, the above antibacterial super-porous hydrogel is applied to the degradation of anionic dyes and heavy metal ions in wastewater.

Figure 2:
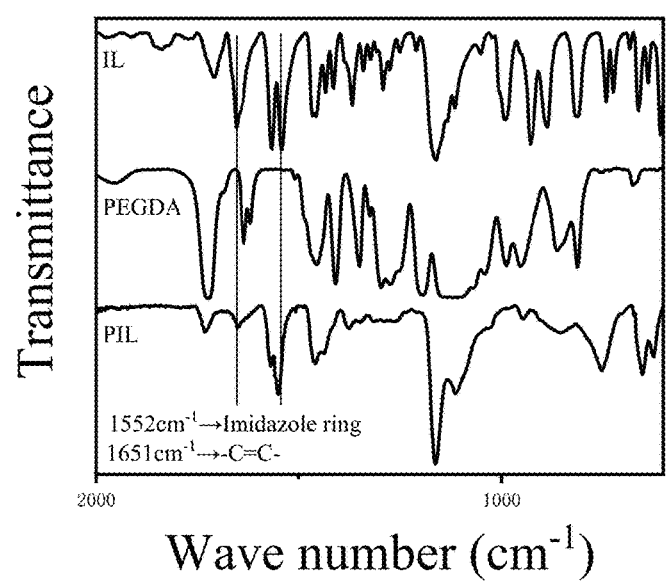
FIG. 2 is an infrared characterization spectrogram of a poly (ionic liquid) super-porous hydrogel (PIL), 1-vinyl-3-butylimidazolium chloride (IL) and polyethylene glycol diacrylate (PEGDA).

FIG. 2 is an infrared characterization spectrogram of a poly (ionic liquid) super-porous hydrogel (PIL), 1-vinyl-3-butylimidazolium chloride (IL) and polyethylene glycol diacrylate (PEGDA).

The technical solution of the present invention is further explained with reference to several preferred embodiments, but the experimental conditions and set parameters should not be regarded as limitations to the basic technical solution of the present invention. Moreover, the scope of protection of the present invention is not limited to the following embodiments.

Comparative Example: Poly (Ionic Liquid) Super-Porous Hydrogel (10% Initial Concentration of Ionic Liquid)

(1) 5 g of 1-vinyl-3-butylimidazolium chloride and 0.5 g of polyethylene glycol diacrylate (with a molecular weight of 600) are added into 50 mL of deionized water, and magnetically stirred for a certain time to obtain a uniform solution (10% initial concentration of ionic liquid); and 0.05 g of photoinitiator lithium phenyl(2,4,6-trimethylbenzoyl) phosphinate is added into the solution, and magnetically stirred for a certain time in the dark until the mixture is completely dissolved.

(2) The solution finally obtained in the step (1) is poured into a mold, and irradiated for 100 minutes under an ultraviolet lamp with a power of 100 W to initiate polymerization to obtain a poly (ionic liquid)hydrogel.

(3) The hydrogel obtained in the step (2) is soaked in the deionized water to dialyze for 12 hours, and an unreacted poly (ionic liquid) monomer and a poly (ionic liquid) homopolymer in the hydrogel are removed. Then, the hydrogel is freeze-dried at −100° C. for 48 hours to obtain the poly (ionic liquid)hydrogel.

Figure 3A:
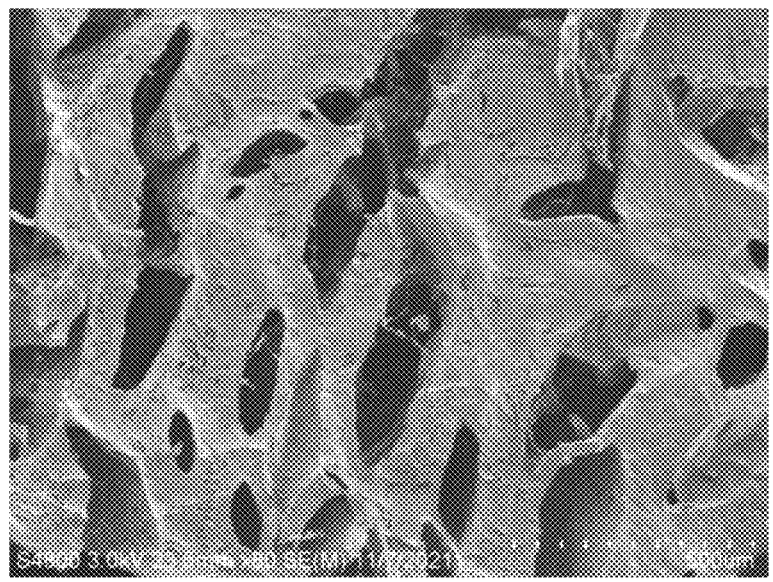
FIG. 3A shows a microtopography (SEM image) of the PIL when an initial concentration of the IL is 50% and amounts of the PEGDA are 0.5 g.
Figure 3B:
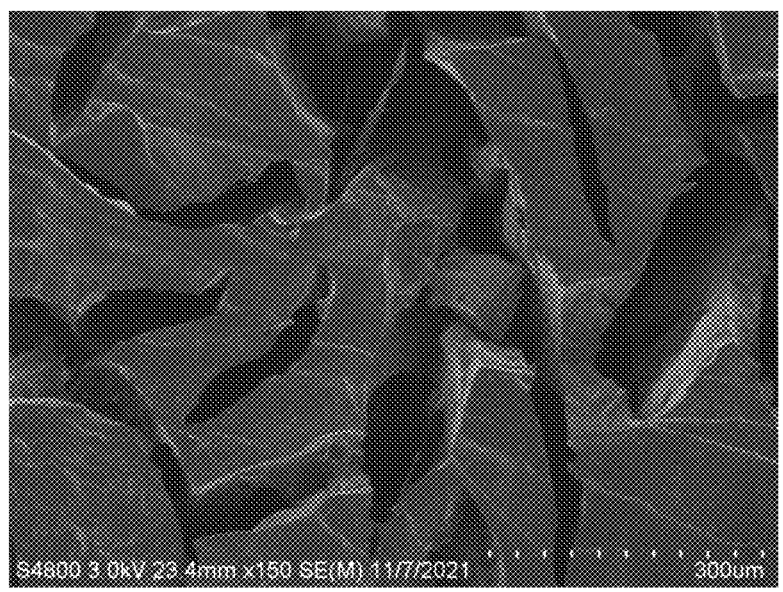
FIG. 3B shows a microtopography (SEM image) of the PIL when an initial concentration of the IL is 50% and amounts of the PEGDA are 1 g.
Figure 3C:
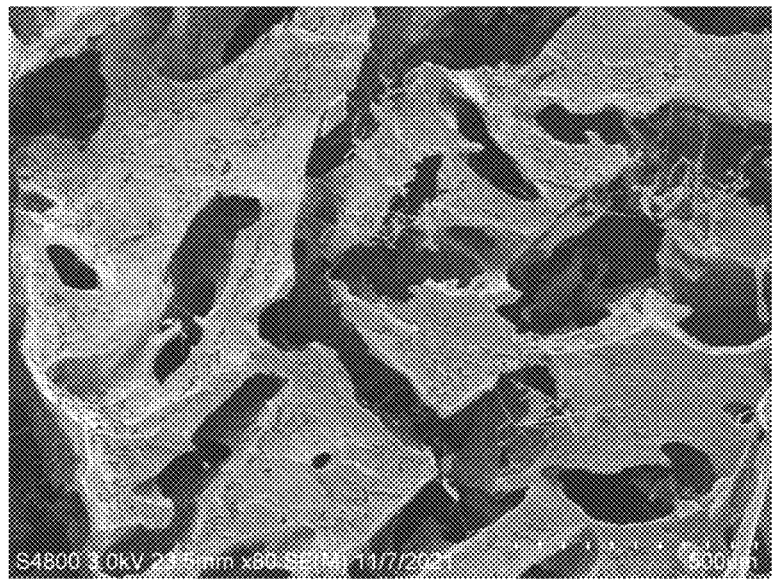
FIG. 3C shows a microtopography (SEM image) of the PIL when an initial concentration of the IL is 50% and amounts of the PEGDA are 0.25 g.
Figure 3D:
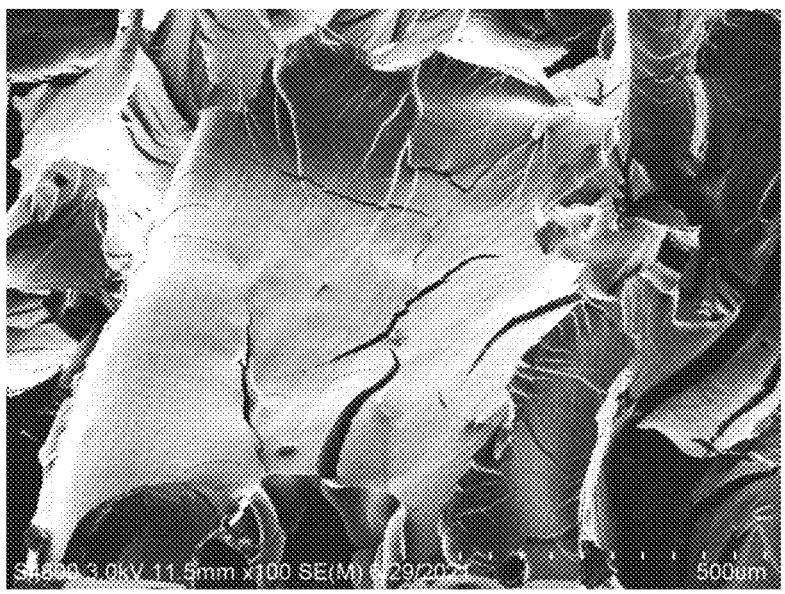
FIG. 3D shows a microtopography (SEM image) of the PIL when the initial concentration of the IL is 10% and the amount of the PEGDA is 0.5 g.

The poly (ionic liquid)hydrogel obtained in the step (3) is detected by a scanning electron microscope, and obtained results are shown in FIG. 3D.

As shown in FIG. 3D, when the initial concentration of the IL is not in the range of 25% to 60%, it is difficult for the ionic liquid monomer to separate from water so as to be difficult to form a stable super-large porous structure after freeze-drying, which is not beneficial to the application in the treatment of anionic dyes and heavy metal ions in sewage.

Embodiment 1: Poly (Ionic Liquid) Super-Porous Hydrogel (50% Initial Concentration of Ionic Liquid)

(1) 5 g of 1-vinyl-3-butylimidazolium chloride and 0.5 g of polyethylene glycol diacrylate (with a molecular weight of 600) were added into 10 mL of deionized water, and magnetically stirred for a certain time to obtain a uniform solution. 0.05 g of photoinitiator lithium phenyl(2,4,6-trimethylbenzoyl)phosphinate was added into the solution, and magnetically stirred for a certain time in the dark until the mixture was completely dissolved.

(2) The solution finally obtained in the step (1) was poured into a mold, and irradiated for 100 minutes under an ultraviolet lamp with a power of 100 W to initiate polymerization to obtain a poly (ionic liquid)hydrogel.

(3) The hydrogel obtained in the step (2) was soaked in the deionized water to dialyze for 12 hours, and an unreacted poly (ionic liquid) monomer and a poly (ionic liquid) homopolymer in the hydrogel were removed. Then, the hydrogel was freeze-dried at −100° C. for 48 hours to obtain the poly (ionic liquid) super-porous hydrogel.

The poly (ionic liquid) super-porous hydrogel obtained in the step (3) was characterized by an infrared spectrum, and obtained results were shown in FIG. 1.

The poly (ionic liquid) super-porous hydrogel obtained in the step (3) was detected by a scanning electron microscope, and obtained results were shown in FIG. 3A.

Embodiment 2: Poly (Ionic Liquid) Super-Porous Hydrogel (50% Initial Concentration of Ionic Liquid)

(1) 5 g of 1-vinyl-3-butylimidazolium chloride and 1 g of polyethylene glycol diacrylate (with a molecular weight of 600) were added into 10 mL of deionized water, and magnetically stirred for a certain time to obtain a uniform solution. 0.05 g of photoinitiator lithium phenyl(2,4,6-trimethylbenzoyl)phosphinate was added into the solution, and magnetically stirred for a certain time in the dark until the mixture was completely dissolved.

(2) The solution finally obtained in the step (1) was poured into a mold, and irradiated for 100 minutes under an ultraviolet lamp with a power of 100 W to initiate polymerization to obtain a poly (ionic liquid)hydrogel.

(3) The hydrogel obtained in the step (2) was soaked in the deionized water to dialyze for 12 hours, and an unreacted poly (ionic liquid) monomer and a poly (ionic liquid) homopolymer in the hydrogel were removed. Then, the hydrogel was freeze-dried at −100° C. for 48 hours to obtain the poly (ionic liquid) super-porous hydrogel.

The poly (ionic liquid) super-porous hydrogel obtained in the step (3) was detected by a scanning electron microscope, and obtained results were shown in FIG. 3B.

Embodiment 3: Poly (Ionic Liquid) Super-Porous Hydrogel (50% Initial Concentration of Ionic Liquid)

(1) 5 g of 1-vinyl-3-butylimidazolium chloride and 0.25 g of polyethylene glycol diacrylate (with a molecular weight of 600) were added into 10 mL of deionized water, and magnetically stirred for a certain time to obtain a uniform solution. 0.05 g of photoinitiator lithium phenyl(2,4,6-trimethylbenzoyl)phosphinate was added into the solution, and magnetically stirred for a certain time in the dark until the mixture was completely dissolved.

(2) The solution finally obtained in the step (1) was poured into a mold, and irradiated for 100 minutes under an ultraviolet lamp with a power of 100 W to initiate polymerization to obtain a poly (ionic liquid)hydrogel.

(3) The hydrogel obtained in the step (2) was soaked in the deionized water to dialyze for 12 hours, and an unreacted poly (ionic liquid) monomer and a poly (ionic liquid) homopolymer in the hydrogel were removed. Then, the hydrogel was freeze-dried at −100° C. for 48 hours to obtain the poly (ionic liquid) super-porous hydrogel.

The poly (ionic liquid) super-porous hydrogel obtained in the step (3) was detected by a scanning electron microscope, and obtained results were shown in FIG. 3C.

Application Embodiment 1: Investigation on Adsorption Capacity of Anionic Dye (Acid Orange 7) in Water (1) 50 mL of standard solutions of anionic dyes of acid orange 7 with different concentrations of 5 mg/L, 10 mg/L, 15 mg/L, 25 mg/L, 35 mg/L, 45 mg/L and 55 mg/L were prepared respectively. Absorbances of the standard solutions were determined by ultraviolet spectrophotometry, and a standard curve of an acid orange 7 solution was drawn by taking a concentration of the acid orange 7 solution as an abscissa and an absorbance as an ordinate.

(2) 10 mg of the poly (ionic liquid) super-porous hydrogel obtained in Embodiment 1 was put into 50 mL of solutions of anionic dyes of acid orange 7 with concentrations of 10 mg/L, 25 mg/L, 50 mg/L, 75 mg/L, 100 mg/L and 150 mg/L respectively, and placed in a constant temperature water bath shaker for shaking and adsorption at room temperature.

(3) 10 mg of the poly (ionic liquid) super-porous hydrogel obtained in Embodiment 1 was put into 50 mL of acid orange 7 solutions with pH values L; of 2, 4, 6, 8, 10 and 12 respectively, and placed in a constant temperature water bath shaker for shaking and adsorption at room temperature.

(4) 10 mg of the poly (ionic liquid) super-porous hydrogel obtained in Embodiment 1 was put into 50 mL of acid orange 7 solutions with a concentration of 500 mg/L respectively, and placed in a constant temperature water bath shaker for shaking and adsorption at 30° C., 40° C., 50° C. and 60° C. respectively.

(5) The acid orange 7 solution was periodically sucked during shaking in the steps (2), (3) and (4), the absorbance was determined by ultraviolet spectrophotometry, and the concentration of the acid orange 7 in the solution at a moment of solution extraction was calculated by a standard curve, so as to calculate the adsorption capacity for the anionic dye of the acid orange 7 of the polyanionic liquid super-porous hydrogel.

Figure 4A:
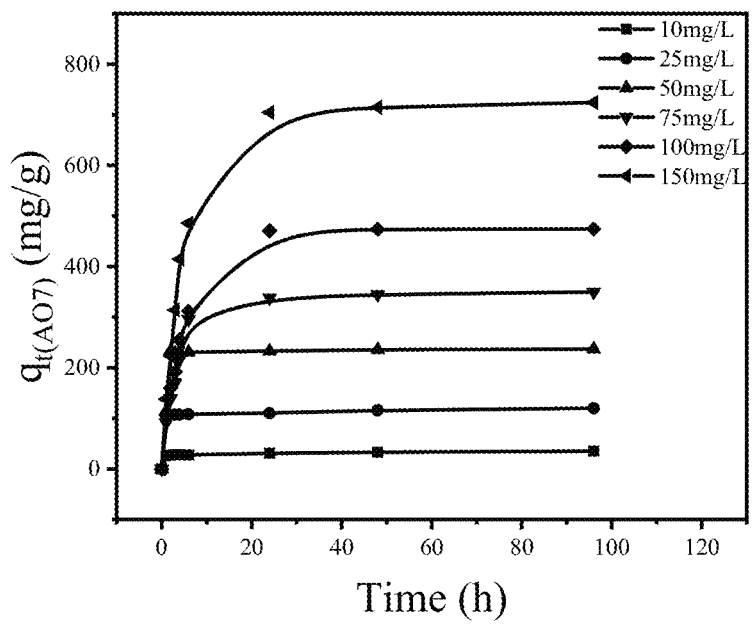
FIG. 4A shows adsorption capacity-time curves for acid orange 7 solutions with different initial concentrations of the PIL.

As shown in FIG. 4A, with the increase of the initial concentration of the acid orange 7 solution, the adsorption capacity for the acid orange 7 in the solution of the polyanionic liquid super-porous hydrogel was also increased, wherein a maximum adsorption capacity could reach 724 mg/g at the initial concentration of 150 mg/L, and balance adsorption was approximately reached after 24 hours.

As shown in Table 1, with the increase of the initial concentration of the acid orange 7 solution, the removal rate for the acid orange 7 in the solution of the polyanionic liquid super-porous hydrogel was also increased, wherein the removal rate for the acid orange 7 in the solution could reach 96.56% at the initial concentration of 150 mg/L.

Table 1 Removal rate for acid orange 7 in solution of poly (ionic liquid) super-porous hydrogel

| $C_0$ (AO7) (mg/L) | 10 | 25 | 50 | 75 | 100 | 150 |
|---|---|---|---|---|---|---|
| Removal rate (%) | 70.52 | 51.37 | 94.84 | 93.26 | 94.87 | 96.56 |

Figure 5A:
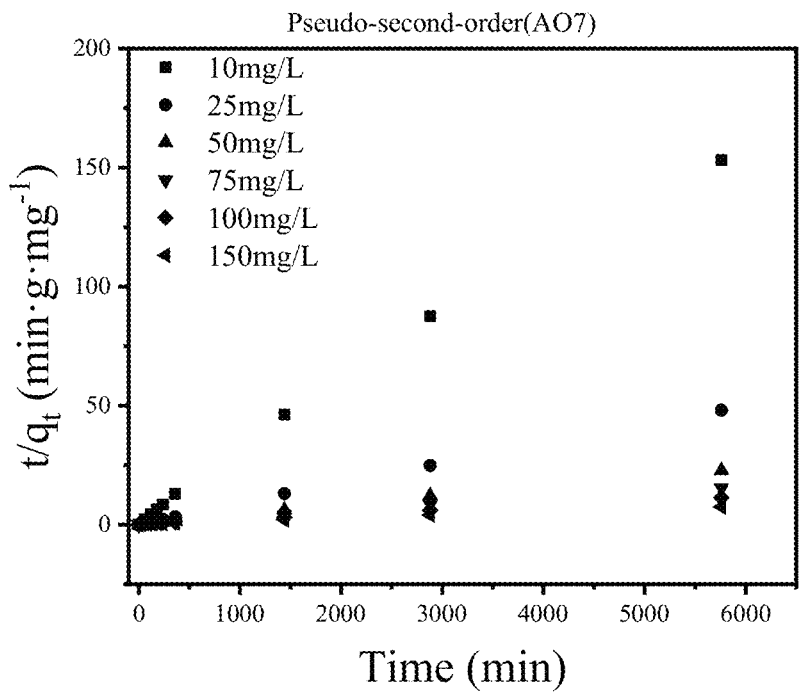
FIG. 5A shows fitting results of pseudo-second order adsorption kinetic models for the acid orange 7 solutions with different initial concentrations of the PIL.

As shown in FIG. 5A and Table 2, an adsorption process for a dye in the acid orange 7 solution of the polyanionic liquid super-porous hydrogel conformed to a pseudo-second order kinetic model, and values of linear fitting correlation coefficients $R^2$ of the pseudo-second order kinetic models were all higher than 0.997. In the pseudo-second order kinetic model, the adsorption rate was determined by a squared value of remaining adsorption sites on a surface of an adsorbent, the adsorption process was controlled by a chemical adsorption mechanism, and the chemical adsorption related to electron sharing or electron transfer between the adsorbent and an adsorbate. A rate constant $k_2$ was reduced with the increase of the initial concentration, because effective adsorption sites of the adsorbent were far more than dye molecules of the acid orange 7 at a low initial concentration, and the dye molecules of the acid orange 7 were easily adsorbed. However, with the increase of the initial concentration, the dye molecules of the acid orange 7 were increased, and formed a competitive relationship with each other, resulting in the reduction of the rate constant $k_2$.

Table 2 Adsorption kinetic parameter for acid orange 7 in solution of poly (ionic liquid) super-porous hydrogel

| | Pseudo-second-order | | | |
|---|---|---|---|---|
| $C_0$ (mg/L) | $q_{e,\ exp}$ (mg/g) | $k_2$ (g · mg$^{-1}$ · min$^{-1}$) | $q_{e,\ cal}$ (mg/g) | $R^2$ |
| 10 | 35.26 | 4.25 × 10$^{-4}$ | 35.06 | 0.99801 |
| 25 | 64.21 | 3.16 × 10$^{-4}$ | 63.69 | 0.99832 |
| 50 | 237.10 | 2.46 × 10$^{-4}$ | 237.53 | 0.99987 |
| 75 | 349.74 | 2.30 × 10$^{-5}$ | 358.42 | 0.99861 |
| 100 | 474.37 | 1.22 × 10$^{-5}$ | 495.05 | 0.99707 |
| 150 | 724.22 | 7.73 × 10$^{-6}$ | 751.88 | 0.99727 |

Figure 6A:
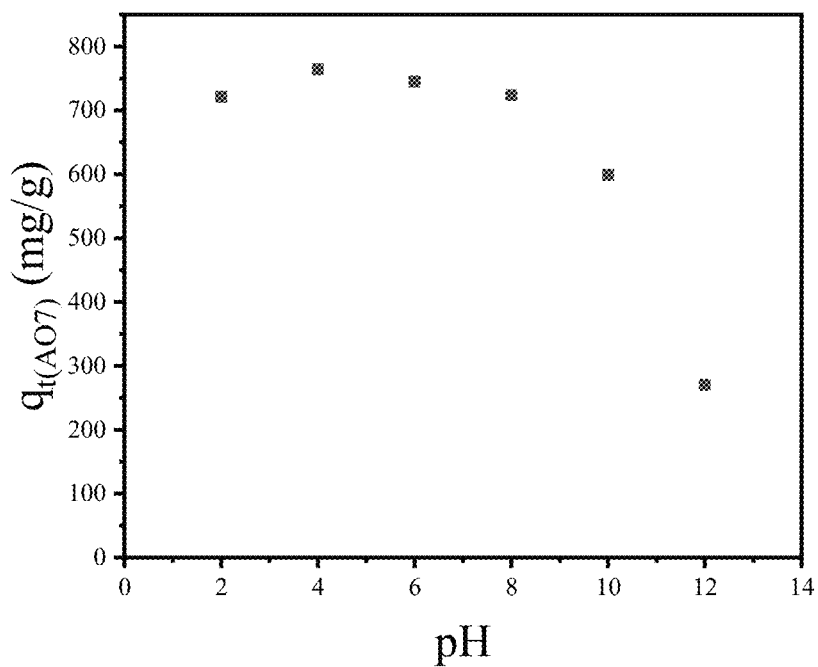
FIG. 6A shows adsorption capacities for the acid orange 7 solutions with different pH values of the PIL.

FIG. 6A shows the adsorption capacities for the acid orange 7 solutions with different pH values of the PIL, and it can be seen that the PIL has the greatest adsorption capacity when pH=4 to 8.

Figure 7:
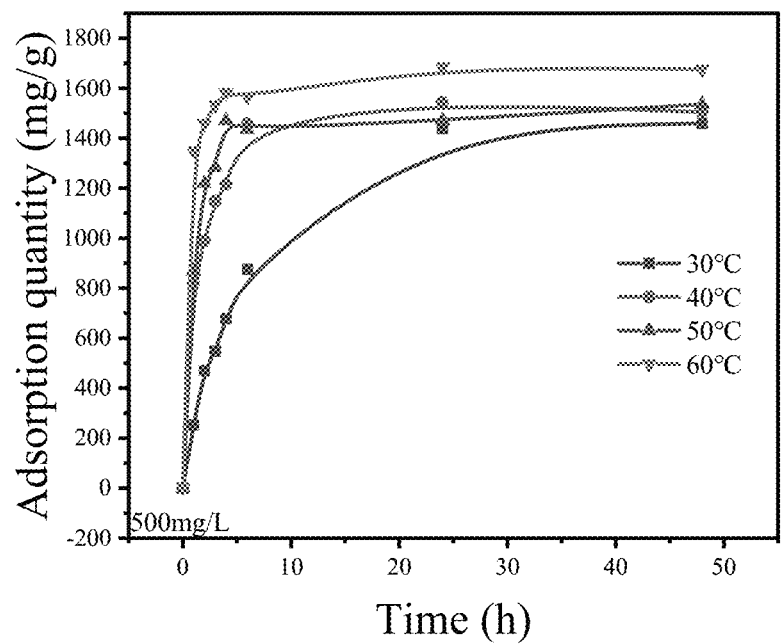
FIG. 7 shows adsorption capacity-time curves for the acid orange 7 solutions at different temperatures of the PIL.

FIG. 7 shows adsorption capacity-time curves for the acid orange 7 solutions at different temperatures of the PIL.

Application Embodiment 2: Investigation on Adsorption Capacity of Heavy Metal Ion Cr(VI) in Water (1) A Cr(VI) solution with a concentration of 1,000 mg/L was prepared, and a pH value of the solution was adjusted by dropwise adding HNO$_3$ and NaOH. 10 mg of the poly (ionic liquid) super-porous hydrogel obtained in Embodiment 1 was put into 50 mL of Cr(VI) solutions with pH values of 2, 4, 6, 8, 10 and 12 respectively, and placed in a constant temperature water bath shaker for shaking and adsorption at room temperature.

(2) 10 mg of the poly (ionic liquid) super-porous hydrogel obtained in Embodiment 1 was put into 50 mL of Cr(VI) solutions with concentrations of 25 mg/L, 50 mg/L, 100 mg/L, 150 mg/L, 200 mg/L and 300 mg/L respectively, and placed in a constant temperature water bath shaker for shaking and adsorption at room temperature.

(3) The Cr(VI) solution was periodically sucked during shaking in the steps (1) and (2), and the concentration of the Cr(VI) in the solution at a moment of solution extraction was determined by an atomic absorption spectrophotometer, so as to calculate the adsorption capacity for the Cr(VI) of the polyanionic liquid super-porous hydrogel.

Figure 4B:
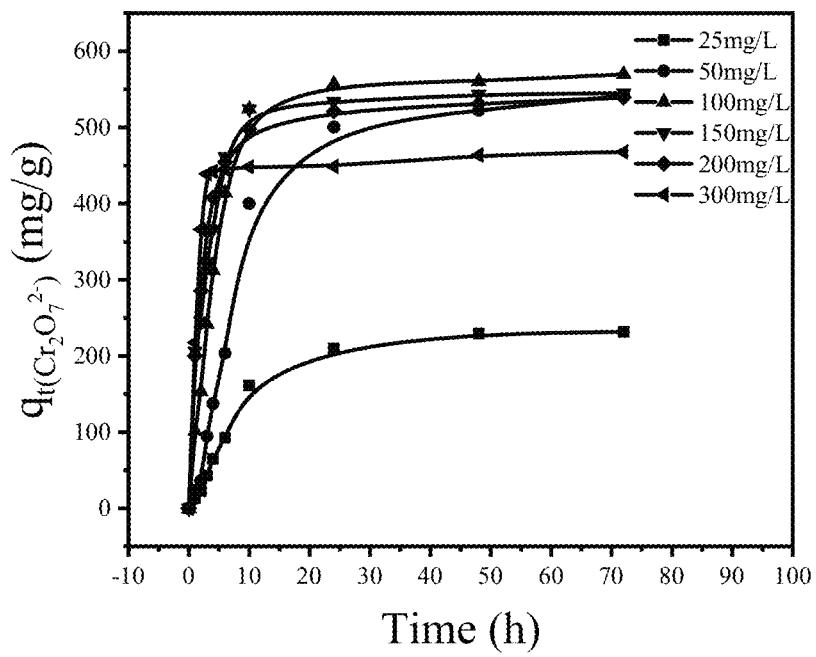
FIG. 4B shows adsorption capacity-time curves for Cr (VI) solutions with different initial concentrations of the PIL.

As shown in FIG. 4B, with the increase of the initial concentration of the Cr(VI) solution, the adsorption capacity for the Cr(VI) in the solution of the polyanionic liquid super-porous hydrogel was also increased, wherein a maximum adsorption capacity could reach 550 mg/g at the initial concentration of 100 mg/L, and balance adsorption was approximately reached after 24 hours.

Figure 5B:
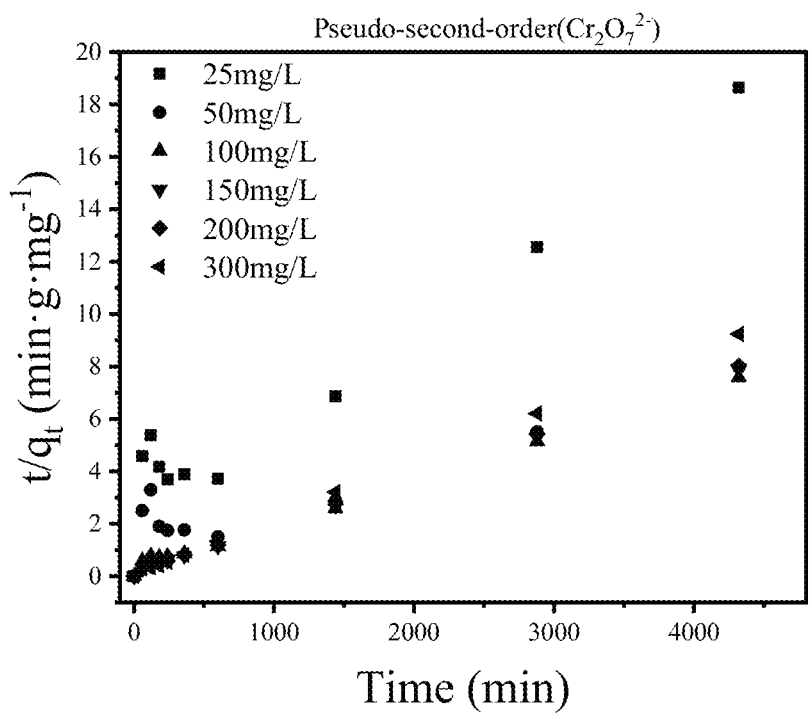
FIG. 5B shows fitting results of pseudo-second order adsorption kinetic models for the Cr (VI) solutions with different initial concentrations of the PIL.

FIG. 5B shows fitting results of pseudo-second order adsorption kinetic models for the Cr(VI) solutions with different initial concentrations of the PIL.

Figure 6B:
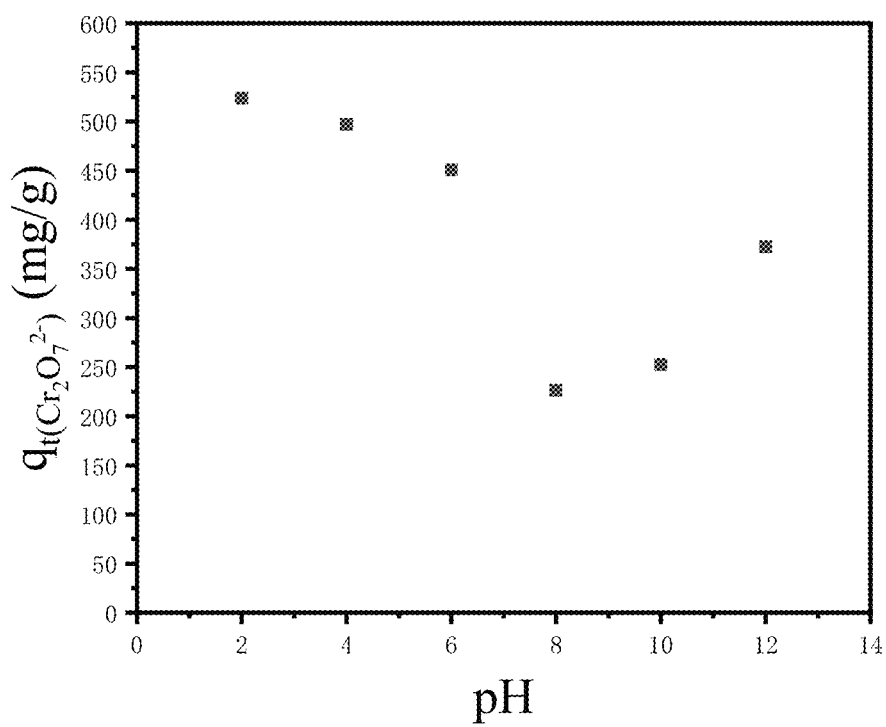
FIG. 6B shows adsorption capacities for the Cr (VI) solutions with different pH values of the PIL.

FIG. 6B shows adsorption capacities for the Cr(VI) with different pH values of the PIL.

Application Embodiment 3: Investigation on Antibacterial Ability of PIL (1) 10 μL of bacterial suspension (1×10$^8$ CFU/mL) was diluted in a LB culture medium (400 μL), then the bacterial diluent was transferred to a LB agar plate, and the plate was obliquely shaken to make the bacterial liquid flow over a surface of the whole plate, and horizontally stood for 30 seconds. Then, the plate was obliquely placed for 30 seconds, and excess bacterial liquid was sucked out by a pipette. Then, the plate was horizontally placed for 2 minutes, and then transferred to an incubator for inverted cultivation at 37° C. for 12 hours.

(2) The PIL hydrogel obtained in Embodiment 1 was cut into discs with a diameter of 1 cm, placed in different positions on the bacterial plate, and cultured in a constant temperature incubator for 24 hours.

(3) Subsequently, the PIL hydrogel and the LB solid culture medium covered with the PIL hydrogel were placed in a centrifuge tube filled with the LB culture medium (3 mL), and rapidly shaken at 37° C. for 10 minutes, so that all bacteria adhered to the PIL hydrogel and the LB solid culture medium were dispersed in the culture medium. A proper amount of bacterial suspension (2 μL) was diluted in the LB culture medium (400 μL) for dilution. The bacterial diluent was transferred to a LB agar plate, and the plate was obliquely shaken to make the bacterial liquid flow over a surface of the whole plate, and horizontally stood for 30 seconds. Then, the plate was obliquely placed for 30 seconds, and excess bacterial liquid was sucked out by a pipette. Then, the plate was horizontally placed for 2 minutes, and then transferred to an incubator for inverted cultivation at 37° C. for 12 hours, and a colony density was observed.

Figure 8A:
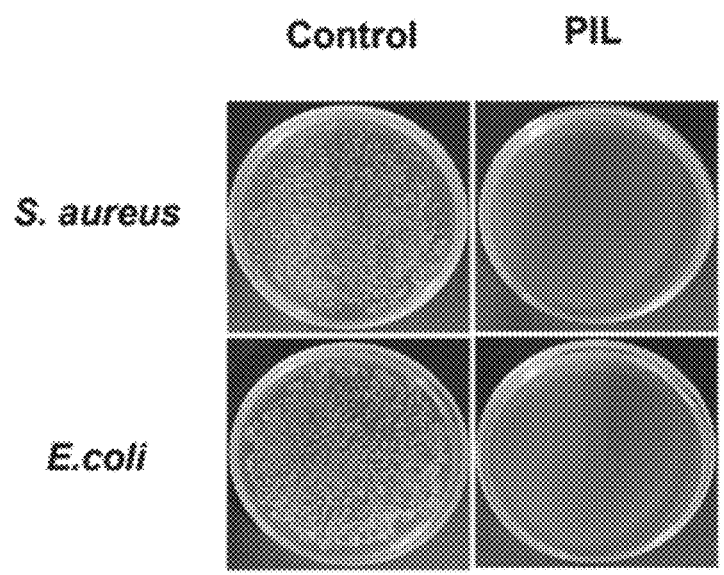
FIG. 8A shows antibacterial tests (by a plate method) for S. aureus and E. coli of the PIL.

FIG. 8A shows antibacterial tests (by a plate method) for *S. aureus* and *E. coli* of the PIL.

Figure 8B:
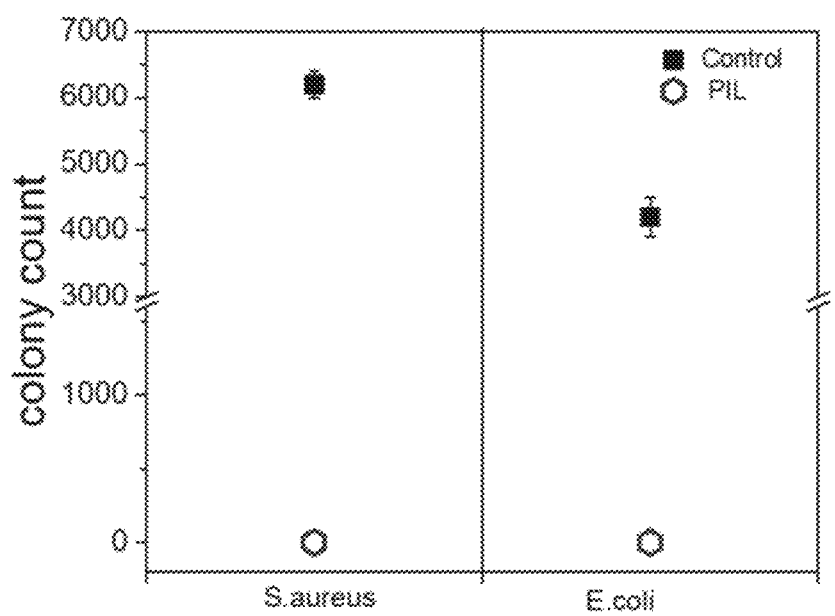
FIG. 8B shows antibacterial tests colony numbers for S. aureus and E. coli of the PIL.

FIG. 8B shows antibacterial tests colony numbers for *S. aureus* and *E. coli* of the PIL.

The above embodiments are not intended to restrict the present invention, the present invention is not merely limited to the above embodiments, and so long as it meets the requirements of the present invention, it belongs to the scope of protection of the present invention.

We claim:

1. A green synthesis method of an antibacterial super-porous hydrogel with rapid adsorption and separation of anionic dyes and heavy metal ions, wherein a pore size of the hydrogel is adjustable from 50 m to 200 m, and the method comprises the following steps of:

step (1): adding an imidazole ionic liquid and polyethylene glycol diacrylate into deionized water, and magnetically stirring the mixture for a certain time to obtain a uniform solution; and adding a photoinitiator lithium phenyl(2,4,6-trimethylbenzoyl)phosphinate into the solution, and magnetically stirring the mixture for a certain time in the dark until the mixture is completely dissolved, wherein a mass ratio of the imidazole ionic liquid to the deionized water is (0.25 to 0.6):1; and a mass ratio of the imidazole ionic liquid to the polyethylene glycol diacrylate is 1 to 100:0.1 to 10;

the imidazole ionic liquid is a vinyl imidazole salt ionic liquid, with a molecular structural formula as follows:

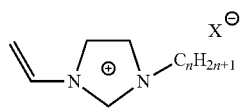

wherein X is one of Cl⁻, Br⁻, $PF_6^-$, $BF_4^-$ and $CH_3COO^-$, and n=2 to 12;

step (2): pouring the solution obtained in the step (1) into a mold, and irradiating for a period of time under an ultraviolet lamp with a certain power to initiate polymerization to obtain a poly (ionic liquid)hydrogel; and step (3): soaking the poly (ionic liquid)hydrogel obtained in the step (2) in the deionized water to dialyze for a certain time, and removing an unreacted poly (ionic liquid) monomer and a poly (ionic liquid) homopolymer in the hydrogel; and then freeze-drying the hydrogel at a certain temperature for a certain time to obtain the poly (ionic liquid) super-porous hydrogel.

2. The method according to claim 1, wherein an anion in the imidazole ionic liquid in the step (1) comprises a chloride ion, a tetrafluoroborate ion and a hexafluorophosphate ion.

3. The method according to claim 1, wherein a mass ratio of the imidazole ionic liquid to the photoinitiator lithium phenyl(2,4,6-trimethylbenzoyl)phosphinate in the step (1) is 1 to 100:0.01 to 1.

4. The method according to claim 1, wherein in the step (2), the power of the ultraviolet lamp is 20 W to 200 W, and the irradiating lasts for 1 minute to 200 minutes.

5. The method according to claim 1, wherein in the step (3), the soaking to dialyze lasts for 1 hour to 72 hours, the freeze-drying is carried out at a temperature of −120° C. to −60° C., and the freeze-drying lasts for 8 hours to 96 hours.

* * * * *